United States Patent [19]

Ogihara et al.

[11] Patent Number: 4,771,309

[45] Date of Patent: Sep. 13, 1988

[54] STROBE CONTROL CIRCUIT FOR FLASH PHOTOGRAPHY

[75] Inventors: Masuo Ogihara; Hajime Oda; Yoichi Seki; Hiroshi Yamazaki, all of Yotsukaido, Japan

[73] Assignee: Seikosha Co., Ltd., Tokyo, Japan

[21] Appl. No.: 707,744

[22] Filed: Mar. 4, 1985

[51] Int. Cl.[4] .............................................. G03B 15/05
[52] U.S. Cl. ..................................... 354/421; 354/137
[58] Field of Search ........ 354/412, 414, 418, 421–423, 354/439, 137, 435, 436, 437, 438, 440, 195.11

[56] References Cited

U.S. PATENT DOCUMENTS

| | | | |
|---|---|---|---|
| Re. 31,034 | 9/1982 | Biber et al. | 354/421 X |
| 3,738,240 | 6/1973 | Mitani et al. | 354/421 |
| 3,836,922 | 9/1974 | Hasegawa et al. | 354/421 X |
| 4,251,141 | 2/1981 | Stemme et al. | 354/435 |
| 4,317,624 | 3/1982 | Shenk | 354/421 X |
| 4,354,748 | 10/1982 | Grimeo et al. | 354/422 |
| 4,534,638 | 8/1985 | Hirohata et al. | 354/418 |

Primary Examiner—W. B. Perkey
Attorney, Agent, or Firm—Bruce L. Adams; Van C. Wilks

[57] ABSTRACT

A strobo control circuit for a program shutter which opens or closes sectors by means of a stepping motor, wherein a data ROM (read-only memory) is accessed in accordance with a value obtained by computing a code representative of a distance to a subject, a film speed and so forth, and after the data stored in the ROM is set in a timer circuit, the timer is started synchronously with start of the stepping motor to produce a strobo trigger signal upon termination of the timer action.

8 Claims, 9 Drawing Sheets

STROBE CONTROL CIRCUIT FOR FLASH PHOTOGRAPHY

BACKGROUND OF THE INVENTION

The present invention generally relates to a shutter control circuit and, more particularly, to a strobe control circuit for producing a strobe trigger signal to provide a proper exposure in flash photography.

It has been customary heretofore that, for generation of a strobe trigger signal relative to a shutter in flash photography, required data including a distance to a subject, a film speed and a guide number of a strobe flash unit is input in the form of an analog voltage or current to a shutter control circuit, and a calculation thereof is executed in an analog mode to determine the time to produce a trigger signal. In such a system where an analog signal is processed, the performance is prone to vary depending on the temperature characteristic, voltage characteristic and so forth of each element, hence requiring a circuit to compensate for such variation.

In some films developed of late, a multiplicity of contacts are provided on the surface of a cartridge, and the film speed is encoded in accordance with a particular pattern of such contacts and is automatically read out by a group of switches. For computing such film speed in an analog mode by the conventional method described above, it is necessary to execute digital-to-analog conversion prior to the computation, so that problems naturally arise with respect to the conversion accuracy and contact resistance of the switches. According to this system, the time obtainable by analog-mode computation with respect to input shooting data is limited merely to one changing arithmetically (as $\frac{1}{2}$, $\frac{1}{3}$ ... in accordance with increase of the film speed multiplied by 2, 4 ...) or to one changing geometrically (as $\frac{1}{2}, \frac{1}{4}$ ...). Consequently, the opening formed by sectors needs to be proportional thereto. Thus, it becomes impossible to apply the above system to any shutter where the sector opening is not in a fixed relationship with respect to time.

SUMMARY OF THE INVENTION

The object of this invention resides in eliminating the disadvantages mentioned above.

According to the present invention, information including a distance to a subject, a film speed, a guide number of a strobe flash unit, a full-aperture F-number of a lens and so forth required for flash photography is coded by means of switches or the like and then input in the form of a digital value to a computing circuit. Subsequently, proper data for determining the light emission timing of the strobe flash unit is selected from data memory means in accordance with the computed value and is preset in a timer circuit. This circuit starts its action synchronously with initial rotation of a stepping motor and generates a strobe trigger signal upon termination of the timer action. Since the preset data has a value corresponding to the opening of the sectors, the opening need not be in a fixed relationship relative to time.

BRIEF DESCRIPTION OF THE DRAWINGS

FIGS. 3(I-1)–3(I-4) are flowcharts of program subroutines employed in the present invention;

Hereinafter the present invention will be described in detail with reference to exemplary embodiments thereof shown in the accompanying drawings.

Figure 1A:
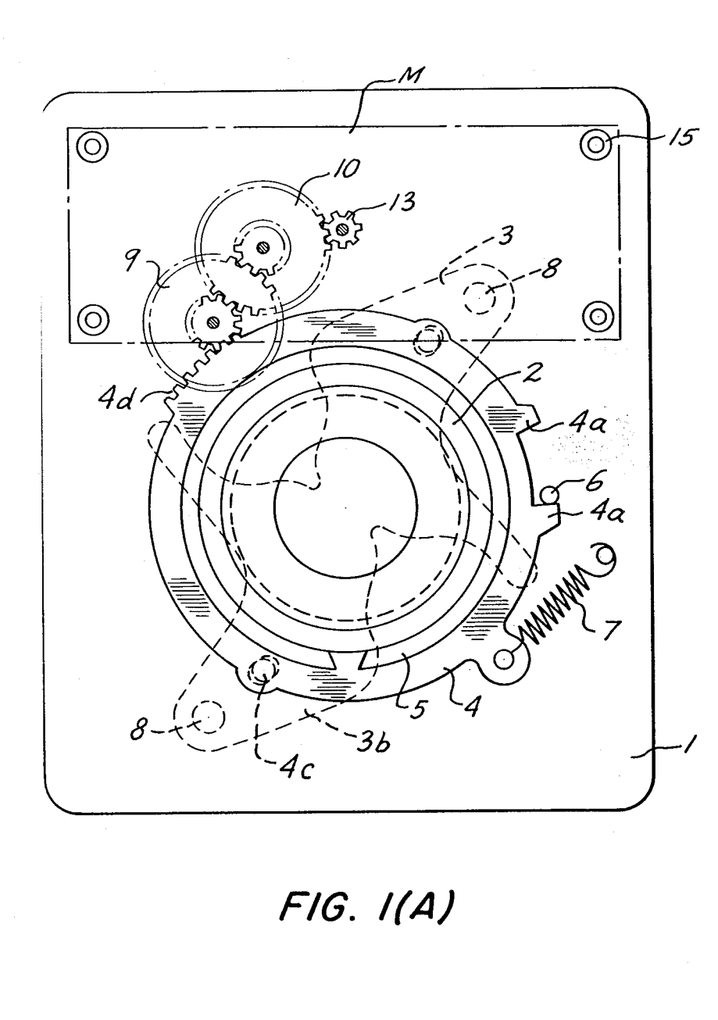
FIG. 1(A) is a plan view of a shutter for use in the present invention.
Figure 1B:
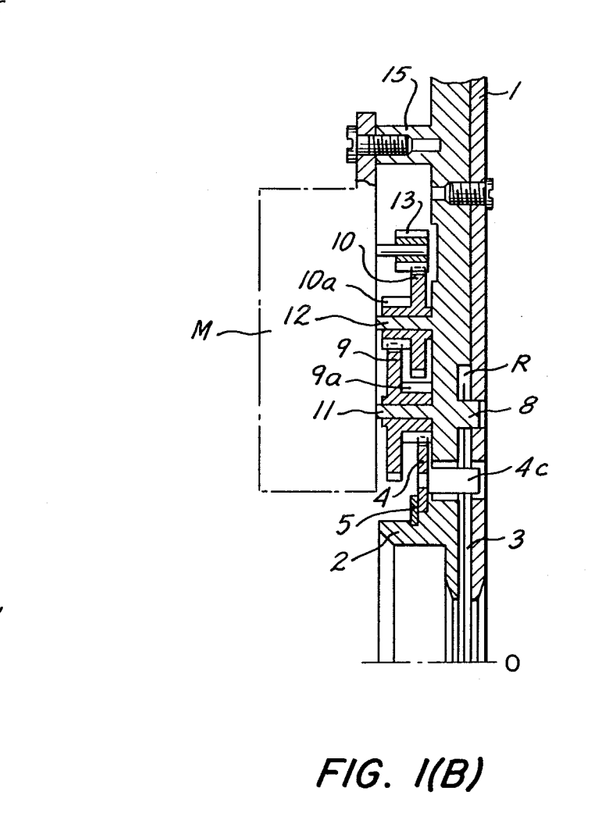
FIG. 1(B) is an enlarged sectional view of part of the shutter of FIG. 1(A)

Referring first to the structure of a shutter illustrated in FIGS. 1(A) and (B), a front plate 2 holding a lens therein is attached to a shutter base plate 1 by means of screws, and an opening O for the lens is formed at the respective centers of the base plate 1 and the front plate 2. A sector room R for housing a sector 3 (which will be described later) is formed between the two plates. A sector ring 4 is supported rotatably by the front plate 2 and is elastically urged counterclockwise by a spring 7 so as to be prevented from slipping out of a snap ring 5. The sector ring 4 has a degree decision portion 4a to determine a rotation range in relation to a pin 6 secured to the base plate 1, a sector pin 4c and a toothed portion 4d. The sector pin 4c pierces through the front plate 2 and is engaged with the sector 3 while being retained in a shaft-and-groove relationship. The sector 3 is supported rotatably by a sector pin 8 anchored to the front plate 2. In the embodiment illustrated, the sector consists of two sheets 3 and 3b to determine the opening. A first gear wheel 9 and a second gear wheel 10 are supported respectively by rotary shafts 11 and 12 secured to the front plate 2, and a pinion 9a of the first gear wheel 9 is kept in mesh with the toothed portion 4d of the sector ring 4, while the first gear wheel 9 is kept in mesh with a pinion 10a of the second gear wheel 10. A pinion 13 attached to a rotor 22 of a motor M is meshed with the second gear wheel 10, and posts 15 anchored to the front plate 2 have internal thread regions for attachment of the motor M.

Figure 2A:
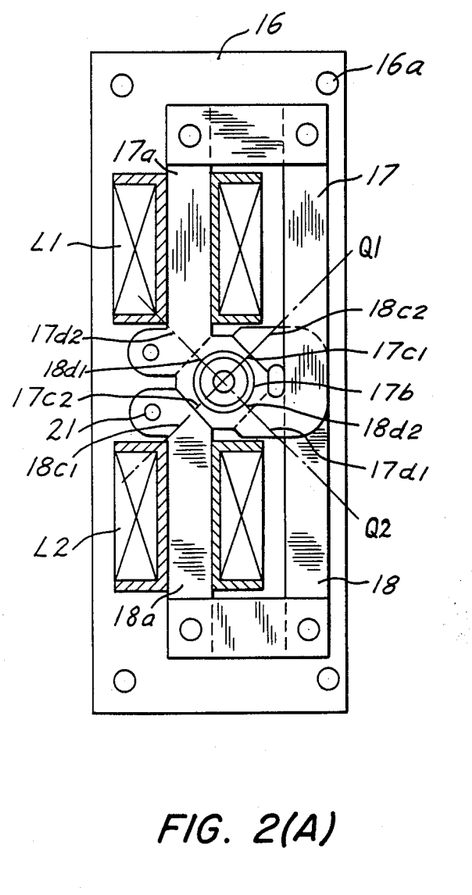
FIG. 2(A) is a plan view of a stepping motor for use in the present invention.
Figure 2B:
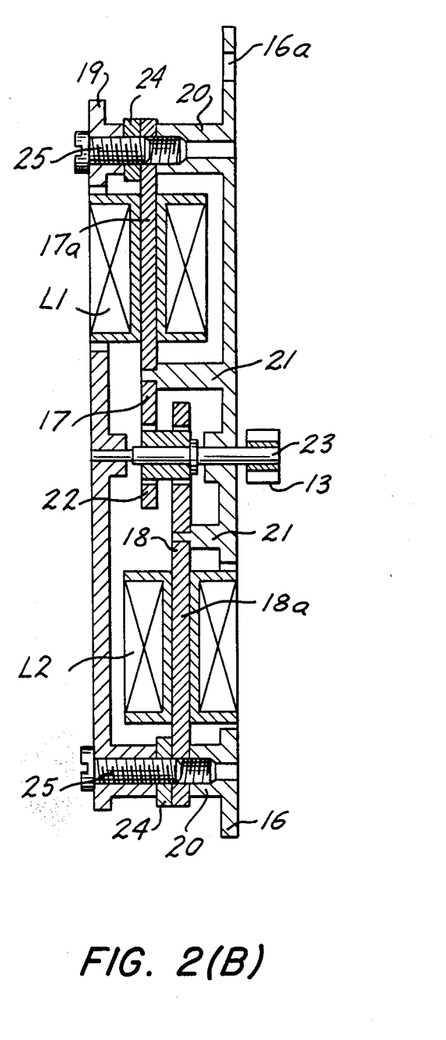
FIG. 2(B) is a sectional view of the stepping motor of FIG. 2(A)

In FIGS. 2(A) and (B) illustrating the structure of the motor M, a motor bottom plate 16 has holes 16a engageable with the aforesaid posts 15, posts 20 for attachment of two stators 17, 18 and a motor top plate 19, and also guide pins 21 for positioning the two stators 17 and 18. A magnet rotor 22 is so magnetized as to have an N-pole and an S-pole in the periphery thereof and is secured to a rotor shaft 23, which is supported rotatably at its upper end by the motor top plate 19 and at its lower end by the motor bottom plate 16. The rotor shaft 23 extends through the bottom plate 16, and the pinion 13 is secured to the fore end thereof. The two stators 17 and 18 are spaced apart from each other by a predetermined distance and have legs 17a and 18a onto which a first coil L1 and a second coil L2 are inserted respectively. And magnetic poles for driving the rotor 22 are formed at the respective central portions of the two stators, which will now be described below in detail.

Referring initially to the shape of the first stator 17, its central region has a hole 17b formed with a predetermined gap kept from the periphery of the rotor 22. Around the contour of the central region, narrow portions 17c1 and 17c2 for limiting a magnetic flux are formed in the vicinity of an axis Q1 which is inclined at an angle of 45° or so with respect to reference axes X and Y, and also thick portions 17d1 and 17d2 are formed in the vicinity above an axis Q2 which is orthogonal to the axis Q1. Thus, in the central region of the first stator 17, the thick portions 17d1 and 17d2 are caused to function as magnetic poles. Similarly, in the second stator 18 disposed at a lower position, narrow portions 18c1 and 18c2 are formed in the vicinity of the aforesaid axis Q1, and magnetic poles 18d1 and 18d2 of the second stator 18 are provided orthogonally to the magnetic poles 17d1 and 17d2 of the first stator. That is, in case no current is flowing in the coils L1 and L2, the poles of the rotor 22 are attracted by the opposed poles 17d1 and 17d2 or 18d1 and 18d2 of the two stators so that the rotor can be brought to stop positions located 90° apart from one another. The aforesaid legs 17a and 18a extend from the poles 17d1 and 17d2 or 18d1 and 18d2 of the stators 17 and 18 and are short-circuited at the fore ends thereof by iron cores 24, hence forming a magnetic circuit. These members are installed in such a procedure that initially the second stator 18 with the coil L2 inserted therein is set on the motor bottom plate 16 while being positioned by the guide pins 21, and then the first stator 17 is set in a similar manner. Subsequently the iron core 24 is placed thereon and, after insertion of the rotor 22 into the central region, the motor top plate 19 is mounted and tightened by means of screws 25, thereby assembling the motor as one block. The motor block thus fabricated is attached to the posts 15 on the base plate by means of screws after securing the pinion 13 to the fore end of the rotor shaft as mentioned previously, whereby a shutter mechanism is constituted.

Figure 3:
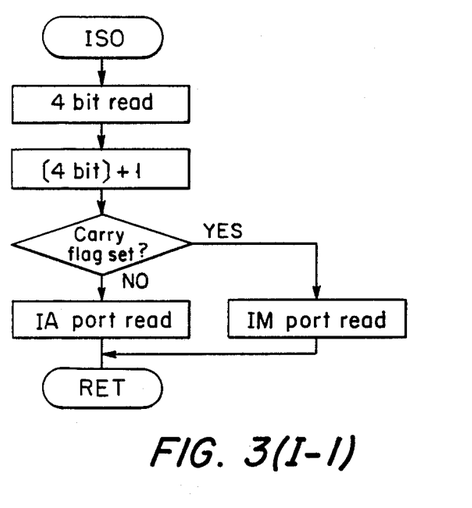
FIG. 3(A) is a circuit diagram of one embodiment of control circuitry according to the present invention.
FIG. 3(B) is a block diagram of the microprocessor shown in FIG. 3(A)
FIG. 3(C) is a circuit diagram of the brightness detection circuit shown in FIG. 3(A)
FIG. 3(D) is a timing chart showing the voltage-time characteristics at several points in the brightness detection circuit of FIG. 3(C)
FIG. 3(E) is a circuit diagram of the motor drive circuit shown in FIG. 3(A)
FIG. 3(F) is a timing chart showing waveforms at various points in the motor drive circuit of FIG. 3(E)
FIG. 3(G) is a block diagram of the counter and motor control circuit shown in FIG. 3(B)
FIG. 3(H) is a flowchart of a main program routine employed in the present invention.
FIG. 3(J) is an explanatory diagram showing the constitution of the D-ROM shown in FIG. 3(B)
FIG. 3(K) is a timing chart showing the relation between the motor drive pulses, direction of motor rotation, and aperture.
Figure 3A:
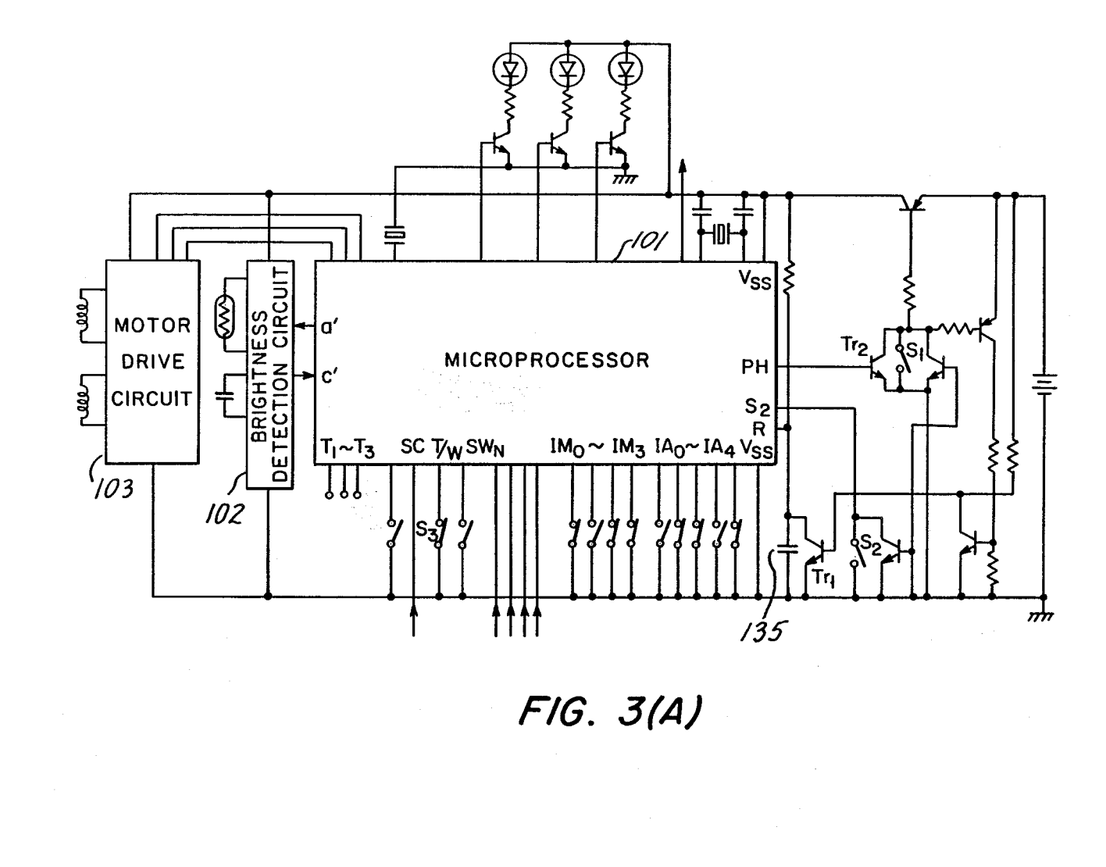
Figure 3B:
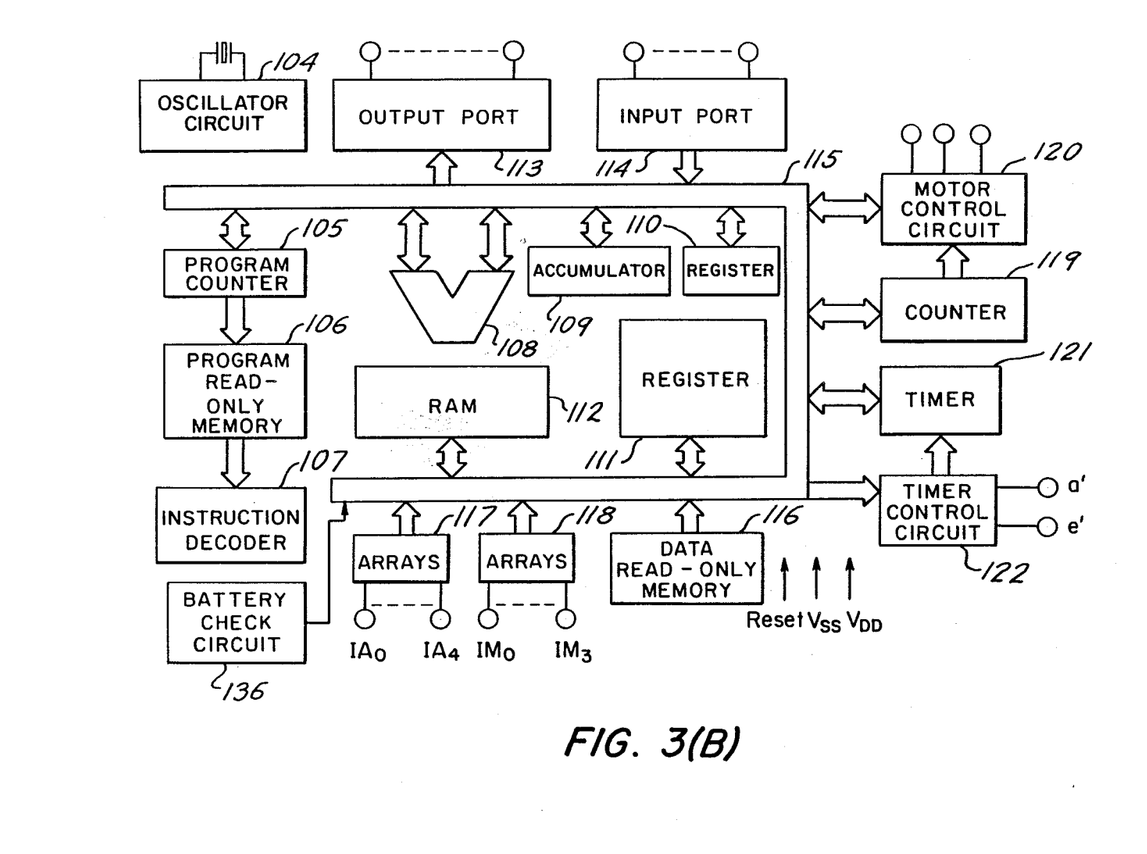

Now a description will be given with regard to circuit diagrams of FIGS. 3(A) through (K). FIG. 3(A) shows the entire circuit configuration of the exemplary embodiment of the present invention including a microprocessor 101, a brightness detection circuit 102 and a motor drive circuit 103. Referring first to the microprocessor 101, its internal constitution is shown in FIG. 3(B) is obtained by adding peripheral circuits to an ordinary single-chip microprocessor function. A circuit 104 comprises an oscillator including a ceramic or crystal vibration element and a clock generator to produce various clock signals required in the microprocessor 101. A program counter 105 functions to control a program read-only memory 106 (hereinafter referred to as P-ROM), and an instruction decoder 107 controls the internal action in response to a command outputted from the P-ROM 106. There are further shown an arithmetic logic unit 108 (hereinafter referred to as ALU), an accumulator 109, a register 110 for setting carry, zero and other flags, another register 111, a random access memory 112 (RAM), an output port 113 having a plurality of output terminals, an input port 114 having a plurality of input terminals, and an internal bus 115.

Since the circuits 104 through 115 mentioned above are naturally provided in any general single-chip computer, the applications and functions thereof are well known and accordingly a detailed description is omitted here with regard to such circuits. In a data read-only memory (D-ROM) 116 are stored various data required for controlling the shutter as will be described later. Programmable logic arrays (PLA1, PLA2) 117 and 118 produce outputs on the bus line 115 in accordance with input conditions at a plurality of input terminals IA-0–IA4 and IM0–IM3. (The use of such outputs will be described later.) There are further shown a counter 119, a motor control circuit 120, a programmable timer 121 (usable also as a counter), and a timer control circuit 122. The operations and functions thereof will be mentioned afterward individually. Although the circuits 116 through 122 are not exactly inherent in the microprocessor, each of them is connected to the bus line to function as a component of the microprocessor. Since the data to be processed for the camera are not so much in amount, the bus line consists of 4-bit conductors. For the convenience of explanation, it is supposed that, unless otherwise specified, a pull-up resistor is incorporated in each of the input terminals.

Figure 3C:
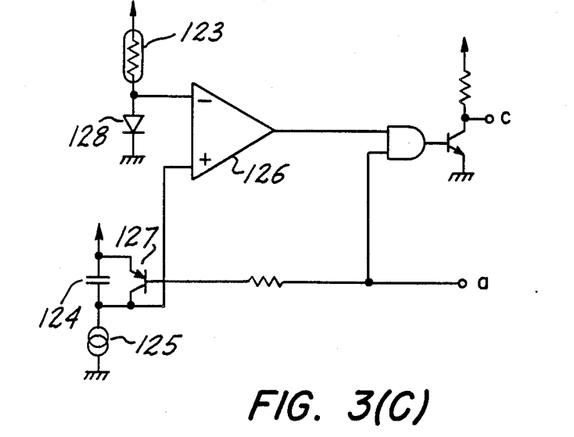

FIG. 3(C) shows an exemplary configuration of the brightness detection circuit 102 employed in FIG. 3(A), and its operation will be described below with reference to FIG. 3(D) as well. (In the figure, like reference numerals denote like component elements.) The brightness detection circuit 102 generates a pulse of a duration corresponding to the amount of light incident upon a photocell 123 (composed of cadmium sulfide in this example), and a voltage proportional to the logarithm of the amount of light received by the photocell 123 is produced at a point c. A reference numeral 128 denotes a logarithm compression diode. A point b represents a junction between a constant current source 125 and a capacitor 124 and is connected to a comparator 126 as shown in the circuit diagram.

Figure 3D:
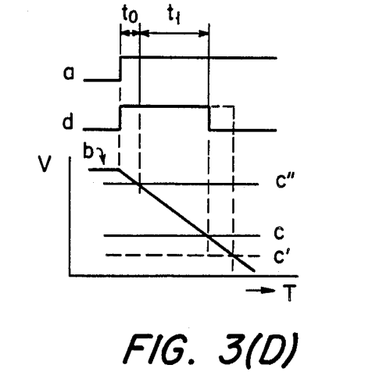

In FIG. 3(D) which is a timing chart of this circuit, when the voltage at the input terminal a is changed from a low level $V_{SS}$ (hereinafter referred to as L) to a high level $V_{DD}$ (hereinafter referred to as H), a transistor 127 is turned off so that the potential at point b drops with the lapse of time as graphically shown. And when the potential becomes lower than the value at point c, the output of the comparator 126 is inverted so that the potential at point d comes to have a waveform d. By such an arrangement the potential at point c varies depending on the brightness, i.e., the amount of light received. For example, when the brightness is small in value, the potential at point c becomes lower (as represented by c') to eventually lengthen the pulse duration. To the contrary, when the brightness is large in value, the pulse duration is shortened (as represented by c''). Since the amount of light received is converted into a compressed voltage by the logarithm compression diode 128 as mentioned previously, the duration of the output pulse is in inverse proportion to the amount of light. That is, in accordance with increase of the brightness at a rate of 2, 4, 8, 16 . . . times, the pulse duration increases as 2, 3, 4, 5 . . . times. However, in case the brightness is extremely high (as represented by c″) or very low, the voltage-to-current relationship of the diode 128 is not maintained to be logarithmic, so that there exists an area where the amount of light and the pulse duration fail to be kept in the relationship mentioned above. The range where the above relationship can be established with accuracy is merely within the limits represented by t1 in the pulse duration, and the remaining time t0 needs to be subtracted as an offset time when converting the brightness into a digital value. The configuration of the brightness detection circuit is based on the known technique, and the photocell of cadmium sulfide used in this embodiment may be replaced with a photodiode as well.

Figure 3E:
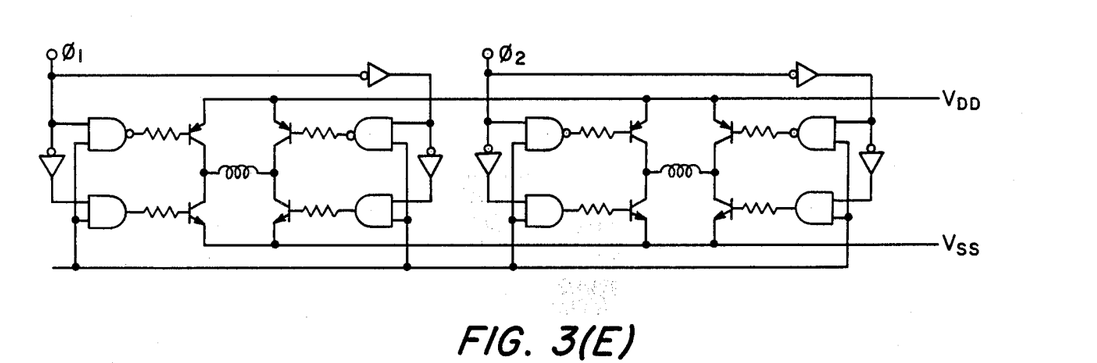
Figure 3F:
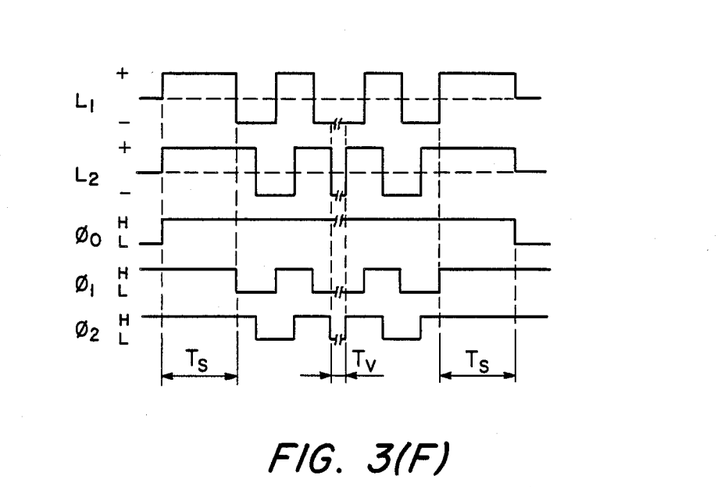

FIG. 3(E) shows an exemplary configuration of the motor drive circuit 103 included in FIG. 3(A). Its operation will now be described below with reference to a timing chart of FIG. 3(F). When a motor switching signal $\phi 0$ has a $V_{SS}$ or low level L, each of the transistors for exciting the motor coils L1 and L2 is in an offstate, as is clear from the figure. Therefore, prior to rotation of the motor, first the switching signal $\phi 0$ is inverted to have a $V_{DD}$ or high level H. And subsequently the coils L1 and L2 are excited in response to the following signals $\phi 1$ and $\phi 2$ as shown in the example, thereby actuating the shutter. Its operation will be described later in detail. (In the state shown in FIG. 3(F), the coils L1 and L2 are energized for forward rotation.)

Figure 3G:
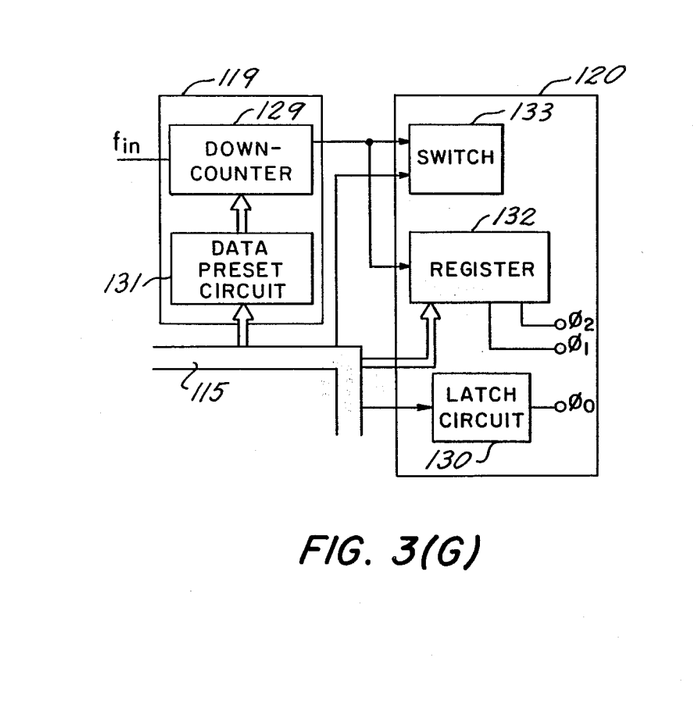

FIG. 3(G) shows exemplary configurations of the counter 119 and the motor control circuit 120 included in FIG. 3(B), wherein there are shown a presettable 10-bit binary down-counter 129, a data preset circuit 131 connected to a bus line and serving to preset fixed data or other suitable data in the counter 129 in response to a command, a 4-bit shift register 132 selectively driven for rightward or leftward shift in response to a count completion signal generated when the content of the counter 129 decrements to zero as a result of count down, a switch 133 for determining the shift direction of the register 132 in response to a command inputted thereto or a count completion signal received from the counter 129, and a latch circuit 130 connected to the bus line and controlled by a command to produce an output which is a motor control signal $\phi 0$. Other motor control signals $\phi 1$ and $\phi 2$ are obtained from the shift register 132.

Figure 3H:
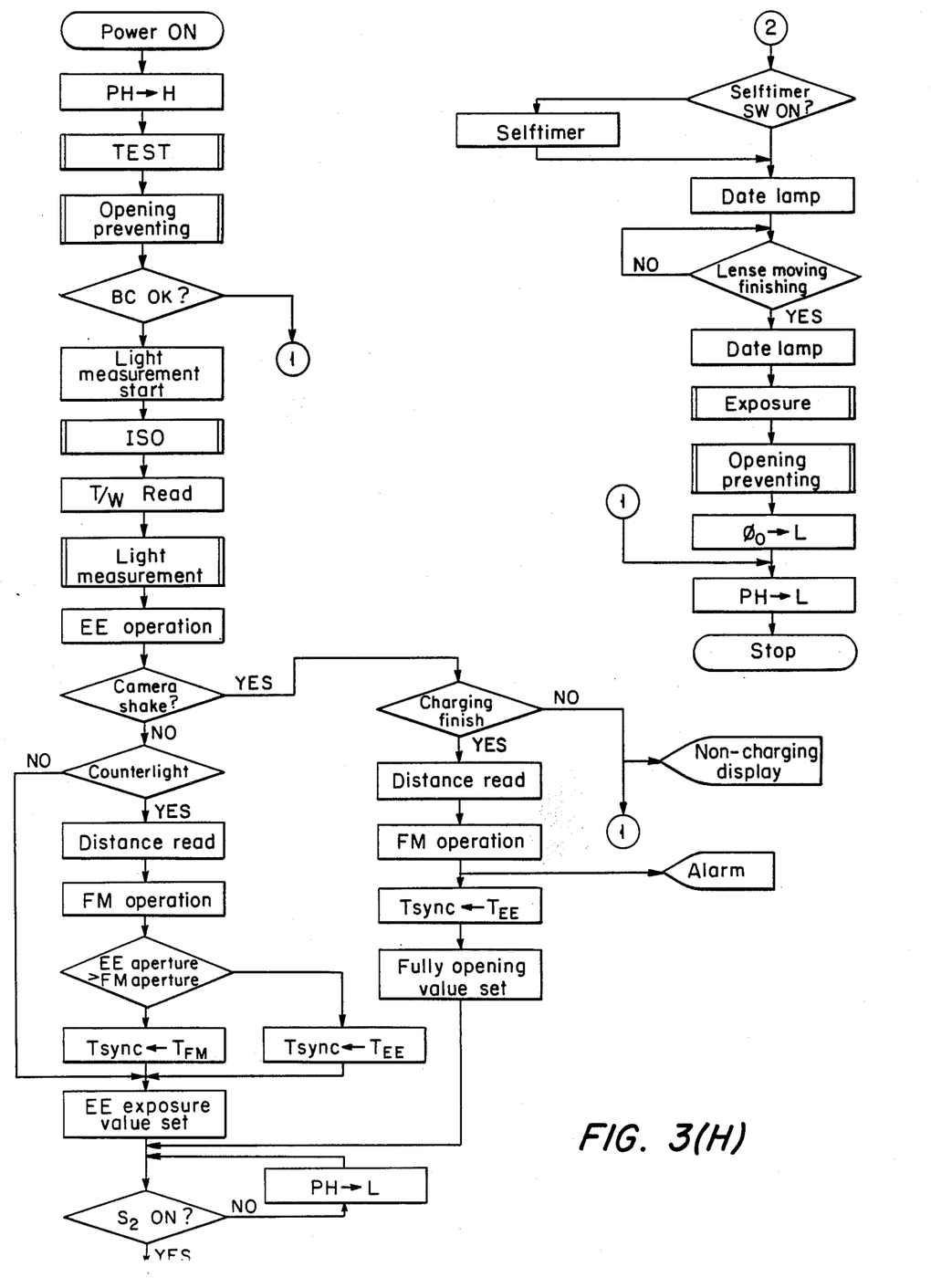

FIGS. 3(H) and (I) are flowcharts of a main routine and subroutines showing the sequence of this invention. Hereinafter the circuit operation according to this invention will be described in more detail with reference to FIGS. 3(A) through (J) as well as to the flowcharts. First, when a release button (not shown) of a camera is depressed, a power switch S1 engaged therewith is turned on to supply power to the microprocessor 101. And simultaneously, as will be understood from FIG. 3(A) a transistor Tr1 is turned off to start charging a capacitor 135. And after the lapse of a predetermined time, the potential is inverted to a level H at the reset terminal R of the microprocessor 101 to which the capacitor 135 is connected, whereby the reset state is released to start execution of a program. In the initial stage of the program, first an output at a power hold terminal PH becomes a level H to turn on a transistor Tr2. Thereafter power is supplied stably regardless of the on-off state of the power switch S1 unless the output at the power hold terminal PH is changed to a level L. Subsequently, test terminals T1, T2 and T3 are read in accordance with the program to ascertain whether the shutter action is set in a test mode or not. (A detailed description will be given later with regard to the test mode. Here, it is assumed that the shutter action is not set in such mode.) Then a step for prevention of opening the shutter is executed to prepare for a case where the shutter is in any faulty condition. A detailed description will be given later with regard to this step as well. When no fault is existent in the shutter, the program passes this step immediately and advances to battery check in the next step. Generally the degree of consumption of a battery is hardly checkable merely from the release voltage thereof, and it is necessary in practice to cause flow of an actual load current to check the battery voltage. In this embodiment, therefore, a current is applied to flow in the coils L1 and L2 of the stepping motor with a motor control signal $\phi 0$ retained at a level H, and the voltage obtained at that time is inspected by a battery check circuit 136 incorporated in the microprocessor 101 (FIG. 3(B)). Since the configuration of the battery check circuit 136 is based on the known technique, no particular description is given here with regard to this circuit. In principle, however, it is so formed that the level becomes H or L when the supply voltage is above or below a predetermined check voltage. If the output of the battery check circuit 136 has a level L which signifies that the supply voltage is low, the program jumps to the final step for turning the power hold terminal PH to a level L, and then the program is brought to a halt. And when the power switch S1 is turned off in this state, no shooting is permitted. In case the output of the battery check circuit 136 has a level H signifying that the supply voltage is sufficiently high, the program advances to the next step. Since the coil current of the stepping motor used as a load for the battery has an inductance, immediate flow of a current is not caused upon turning the motor control signal $\phi 0$ to a level H. Actually, therefore, the output of the battery check circuit needs to be read after the lapse of an adequate delay time from change of the signal $\phi 0$ to a level H. (Even in the case of some other load having no inductance, there occurs an instance where the battery voltage drops with the lapse of time, so that such time should be taken into consideration.)

When the battery voltage is confirmed to be high through the above check, photometering is started to find the brightness of a subject. Initiation of such metering is effected when the output terminal a' of the timer control circuit 122 in the microprocessor 101 is turned to a level H by a command. Since the output terminal a' is connected to the terminal a shown in FIG. 3(C), the brightness detection circuit 102 performs the aforesaid operation and provides, at its output terminal e, a pulse of a duration corresponding to the brightness. The output terminal e is connected to the input terminal e' of the timer control circuit 122 in the microprocessor 101 shown in FIG. 3(B). A signal obtained at the terminal e' is used to produce a gate signal for the timer 121. A numerical value of, e.g. 100, is set previously in the timer 121 and, if the value has changed to 70 after the photometering, the difference of 30 therebetween becomes a value corresponding to the brightness.

However, in order to compensate for the nonlinear characteristic of each component element of the brightness detection circuit 102 with respect to the amount of incident light, a pulse duration is furnished with an offset allowance, as described already. Therefore, it is necessary to subtract such allowance from the measured value. Supposing now that the allowance has a numerical value 10, the actual brightness comes to be 30−10=20. The operation for converting the brightness into a corresponding number of pulses requires a considerable length of time as will be clear from the circuit diagram and, although depending on the degree of brightness, it is customary to set a value on the order of 100 microseconds to 1 millisecond.

Since the microprocessor 101 has a capability of processing a large number of separate tasks during such period of time, after a photometering start signal alone is outputted as shown in the flowchart, the program immediately advances to a next step "ISO" for reading a film speed. In this step, a film speed is obtained automatically by reading the encoded pattern of contacts provided on a film cartridge developed of late as mentioned previously. Switches formed by utilizing the contacts of such film cartridge are connected to input terminals IA0–IA4 shown in FIG. 3(A), and manual switches are connected to input terminals IM0–IM3. In determining one film speed to be read out of those inputted from such two systems, it is the most desirable that the selective decision be made automatically by the microprocessor 101. An exemplary procedure for such decision will be described below.

The film speed code known today consists of a common contact and five contacts representing the film information and arranged in such a manner that, when any of film speeds ranging from ISO 25, 32, 40, 50 . . . to 5000 is selected, at least one of the five contacts is held at the same potential as that of the common contact. Accordingly, the potential of at least one contact comes to have a level L or H depending on whether the common contact is connected to $V_{SS}$ or $V_{DD}$. Supposing now that the common contact is connected to $V_{SS}$ in an exemplary case of using a conventional film without such code contacts, all of the switches connected to the terminals IA0–IA4 in FIG. 3(A) are turned off, so that the potential at each of the 5-bit input terminals comes to have a level H. (A pull-up resistor is incorporated at each of the input terminals.) In this embodiment where the microprocessor 101 has a 4-bit configuration, the 4 bits at the terminals IA0–IA3 are read and then 1 is added thereto.

If a carry flag is set, the film can be regarded as a type without the above code contacts. Accordingly, a desired film speed is obtainable by reading the film information inputted by the manual switches. Such procedure is shown in the flowchart of FIG. 3(I-1). If the common contact is connected to $V_{DD}$ in the case of using a film without any code contacts, all of the switches connected to the input terminals IA0–IA4 are turned off, so that the potential at each of the 5-bit input terminals comes to have a level L. (In this case, it is assumed that a pull-down resistor is incorporated at each of the input terminals.) Subsequently, the 4 bits at the terminals IA0–IA3 are read and then 1 is subtracted therefrom to generate a borrow. And if a carry flag is set, the film can be regarded as a type without the code contacts.

The feature of such film code resides in that at least one of two specific terminals comes to have the same potential as the common contact regardless of any film speed. Accordingly, utilizing the above feature enables another method to selectively determine the film speed information to be read. That is, in case the common contact is connected to $V_{SS}$, a desired film speed is obtainable by reading, only when both of two specific terminals have a level H, the film speed information set manually. Thus, such a method is capable of selectively determining the film speed information to be read out of two systems set automatically and manually.

The code representing the film speed information is not exactly inputted in a form suited to facilitate subsequent internal computation. And it should be regarded as an individual system completely different from the code for internal computation, or there may arise a problem of restriction to the arrangement of manual switches and so forth to eventually bring about some disadvantages. It is therefore necessary to execute code conversion, which can be carried out by programmable logic arrays 117 (PLA1) and 118 (PLA2) shown in FIG. 3(B). With regard to film speed information of different code systems inputted from two groups of switches, the logic arrays PLA1 and PLA2 are so formed that, in case the film speed is, for example, ISO 100 in both code systems, the same code can be read out in response to a command. The ISO code thus read out is then stored in the RAM 112. (Although in this embodiment the code conversion is carried out by the use of programmable logic arrays, it may be executed according to a program if the conversion is easy. In such a case, the logic arrays are not required.)

Subsequently, the microprocessor 101 reads the state of its input terminal T/W. In most low- and middle-priced cameras, the lenses thereof are generally not interchangeable. Consequently, it is necessary to use a lens of one focal length for shooting both portraits and scenery, so that requirements for satisfactory photography can hardly be met. In view of this point, there has been proposed of late an improved method which changes the focal length by moving another lens into or out of the shooting optical path when necessary. In this case, where the full-aperture F-number of the lens system is changed, the information relative to such change needs to be taken into consideration in computing the exposure. The input terminal T/W is provided for such purpose to indicate the state of the lens system with respect to either a telephoto side or a wide-angle side. Since the lens system is optically "light" on the wide-angle side in general, the data representing the extent of darkness induced by switchover of the lens system from the reference wide-angle side to the telephoto side is written previously in the program of the microprocessor 101, and such data is utilized in various calculations.

In this example, it is assumed that the telephoto lens is selected in an arrangement where the wide-angle lens or the telephoto lens is selectable as desired when a switch S3 connected to the terminal T/W is turned on or off. Here, it is also assumed that the potential at the terminal S/T has a level H, and the wide-angle lens has a full-aperture F-number of 2.8 while the telephoto lens has an F-number of 5.6. That is, the difference between these F-numbers is equivalent to two stops of the lens aperture. Now, since the telephoto lens is selected, a numerical value "16" corresponding to two stops of the lens aperture in an aftermentioned code system is stored in the RAM. (In case the wide-angle lens is selected, a numerical value "0" is stored.) The process up to this stage is completed in a short period of time due to the rapid operation of the microprocessor 101 (normally on the order of 1 to 10 microseconds per step). However, it is highly probable that the photometering step is still in progress. In "Photometering", the output e of the brightness detection circuit 102 becomes a level H upon termination of the photometering as shown in the flowchart of FIG. 3(I-2). After completion of the photometering step, the resultant value is computed by the method mentioned above. In case the photometering step is prior to completion, a check is executed to ascertain whether the measured value has exceeded the maximum or not. And if not, such loop is repeated until either termination of the metering or overflow of the measured value. Usually the maximum of the measured value is selectively established at a limit where the aforesaid relationship between the amount of incident light and the pulse duration becomes nonlinear. Consequently, in case the measured value has exceeded the maximum, there exists the possibility of inducing failure in attaining a proper exposure, and the exposure time becomes extremely longer beyond the practically permissible range. For this reason, the photometering is finished upon excess of the actually measured value beyond the maximum, and the predetermined maximum is regarded as the measured value.

Information required for automatic shooting under natural light condition includes the brightness of a subject and a film speed in the case of a program shutter. However, when the full-aperture F-number of the lens system changes as in the present invention, the information relative to the F-number is also required. Since such information has been rendered clear by the processing up to this stage, the conditions for automatic shooting can be computed therefrom in the next step "EE Calculation".

In the calculation system of the present invention, the relationship between the brightness and the measured value can be processed entirely by apex calculation due to logarithmic compression if handled similarly to other factors such as the film speed and the F-number. In the operation of a microprocessor, although multiplication and division are also possible in principle, the computation becomes extremely complicated practically with another disadvantage of a prolonged processing time. It is therefore preferable to adopt apex calculation which enables the processing merely with addition and subtraction. According to the present invention, a film speed and an F-number are once converted to a code which is processible by the apex calculation. For example, with regard to film speeds ranging from a maximum of ISO 1600 to a minimum of ISO 25, they are converted to such a code that ISO 1600 is set as 0 and a numerical value 8 is added thereto for each successive one-grade reduction of the film speed. That is, the individual film speeds are so coded as to establish the relationship in which ISO 1600 corresponds to 0, ISO 800 to 8, ISO 400 to 16 . . . ISO 50 to 40, and ISO 25 to 48.

In a similar manner, with regard to F-numbers also, a numerical value 8 is added per stop of the lens aperture. For example, there is a two-stop difference between F 2.8 and F 5.6 as described previously, and such difference is represented by a numerical value 16. Since there may be available some films having fractional speeds of ⅓ grade and ⅔ grade, code conversion is so executed as to set ⅓ grade as 3 and ⅔ grade as 5, respectively, to realize an approximation. Consequently, ISO 80 is represented by a code 35, and ISO 64 by 38.

As for the brightness of a subject, or object field the constant of the brightness detection circuit 102 and the clock frequency of the timer 121 are so established that a measured value becomes 0 in the case of a measurable maximum brightness, and thereafter a numerical value 8 is added to the measured value in accordance with each reduction of the brightness to one half.

Assuming now that the measured value in photometering indicates 24 at a certain brightness with a film speed of ISO 100, the sum Ex of codes L, S and A becomes $Ex = L + S + A = 24 + 32 + 16 = 72$ (when the lens system is switched to the telephoto side), in which code L stands for the measured value in photometering, code S for the film speed, and code A for the difference between full-aperture F-numbers respectively. The sum Ex represents an exposure value Ev in the case of a program shutter. Accordingly, if $Ev = 13$ when $Ex = 72$ including a film speed of ISO 200, it follows that $Ex = 16 + 32 + 16 = 64$, so that Ev is also changed by one grade to 14. In case the lens system is on the wide-angle side, since $A = 0$, we obtain $Ex = L + S + A = 24 + 32 + 0 = 56$, and therefore $Ev = 15$. Consequently, the exposure value Ev also comes to vary by one grade in conformity with each change of 8 in the calculation code, whereby proper calculation can be carried out. In the step "EE calculation", the aforementioned $L + S + A$ is computed to obtain the value Ex, which is then stored in the RAM 112.

Upon completion of the EE calculation, the next step "Camera Shake" is executed to check if the shutter speed is so low as to cause shake of the camera. This execution is the same as to ascertain whether the value "Ex" obtained already is greater than a certain value. When the value Ex is in excess of a limit predetermined with respect to camera shake, the strobe flash unit needs to be used. Therefore, the state of a terminal SC is checked to determine if the flash unit is completely charged or not. In case the charge is not complete, the potential at a terminal L1 is altered to a level H to turn on a light emitting diode LED 1, thereby producing an alarm signal. Under such condition, shooting without a flash brings about shake of the camera to eventually fail in taking a satisfactory photograph. In order to avoid such failure, the program jumps to step [1], thereby prohibiting the shooting as in the aforementioned case. When complete charge of the strobe flash unit is confirmed, the next process is executed to obtain shooting distance information required for flash photography. Such distance information is derived from an unshown automatic focusing circuit and is fed in the form of encoded parallel data to input terminals AF0–AF3 of the microprocessor processor 101.

However, for enabling the input code to be directly usable for calculation, it is necessary to establish the code in such a manner that a numerical value 8 is added per increase of the distance $\sqrt{2}$ times. Since the shooting distance to be measured ranges generally from 0.8 to 4.5 m or so, if a distance of 0.8 m is established as 0 in the code, it follows that a distance of 4.53 m corresponds to 40. However, any value exceeding 15 in the code is hardly processible in a 4-bit circuit configuration, and it is difficult for the automatic focusing circuit to carry out such code conversion. For example, in case the automatic focusing circuit has a distance measurement series of 0.8, 0.9, 1.0, 1.1, 1.2, 1.5, 1.7, 2.0, 2.5, 3.0, 4.0 and 4.5 m, this may be coded sequentially as 0.1 . . . 11. Then it becomes possible to select any of 16 distance steps with a 4-bit combination. No particular problem arises if the distance further increases from 4.5 m to 6 m, 8 m and so forth, and the automatic focusing circuit can be formed with more facility in relation to such a sequential code. However, the above code is not adapted for direct use as a calculation code, so that code conversion becomes necessary. And the post-conversion code needs to have the aforementioned series in which a numerical value 8 is added per increase of the distance $\sqrt{2}$ times.

Figure 3J:
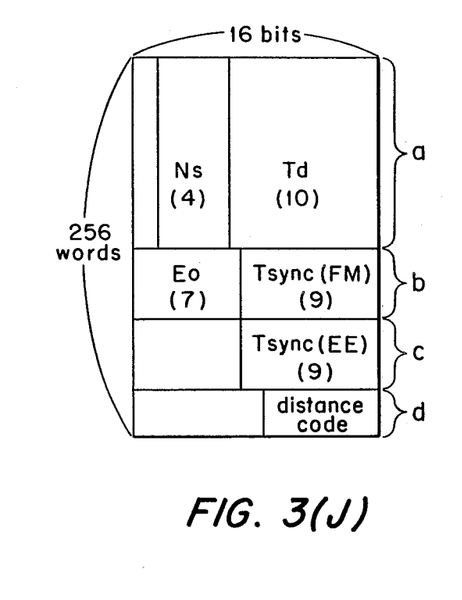

The code conversion, which is performed by the D-ROM 116, will be described later with regard to the detailed procedure thereof, and here the explanation will be continued on an assumption that such code conversion has been completed. The coded data thus converted is then processed in the next "FM Calculation" to determine the F-stop of the shutter in flash photography from the film speed, the distance to the subject, or object field and the guide number of the strobe flash unit. In the present invention where the shutter is of the electric type and therefore has no mechanism to stop the sectors mechanically at the F-number determined by computation, a trigger signal for flashing the strobe unit is produced when the sectors have reached a position corresponding to the computed F-number during its course of being opened, whereby a proper F-number is ensured. And subsequently the sectors are opened to the full aperture thereof and then are closed. Accordingly, the exposure (time) is set at a specific value independently of the aforesaid "Ex" value obtained in the "EE Calculation".

Among a guide number GNO, a distance D and a stop F, there exists the relationship $F=GNO/D$. In the recent cameras equipped with a strobe flash unit, the guide number thereof is fixed, so that determination of the distance automatically determines the stop. Since a complicated procedure is required to execute division in the microprocessor, a correspondence table of distances and stops may be prepared for replacement of such division, whereby a desired stop can be found therefrom with facility. However, due to the necessity of taking the film speed into consideration in addition thereto, "FM Calculation" is carried out according to the following expression. A code $A_{FM}$ representative of a desired stop has the relationship $A_{FM}=S+D+A$ with respect to a film speed code S, a distance code D and a full-aperture F-number difference code A.

In such a stop code $A_{FM}$, the stop area needs to become greater or smaller in conformity with an increase or decrease of the coded value. And it is also necessary that the stop opens by one step (e.g. from F 16 to F 11) per addition of a numerical value 8 in the $A_{FM}$ code. Therefore, in an example where the stop is F 16 when computed with a film speed of ISO 100 and a distance of 1.4 m, the stop changes to F 11 with an increase of the distance to 2 m. And under the condition of ISO 200 and 1.4 m, the stop becomes F 16. It is to be understood that the result obtained from the above expression represents a coded stop value and not the stop itself. The desired stop is found from the correspondence table provided in the D-ROM 116 which will be described later. In case the coded stop value $A_{FM}$ is in excess of the full-aperture F-number of the lens which, for example, is 49, then the $A_{FM}$ is defined as 49. When the stop required as a result of the calculation is above the full-aperture F-number of the lens as in the foregoing example, the amount of light is still insufficient even with the stop full open. In such a case, therefore, an alarm is emitted. (This step is shown as "Extra-interlock Alarm" in the flowchart.)

When the subject brightness measured in "Camera Shake" is sufficiently high to be free from causing shake of the camera, then the program advances to check if the subject is back-lighted or not. Backlight information is inputted by a photographer through actuation of a switch or the like when the sun is behind the subject. If the subject is not in a backlight condition, the exposure time is determined on the basis of the aforementioned Ex value. It is understood, of course, that using the strobe flash unit is not necessary in such a case.

In the backlight condition, the exposure time is determined according to the calculated value Ex as in the case of normal shooting performed without use of the strobe flash unit, and the flash unit serving as an auxiliary light source is controlled in accordance with the data including the distance to the subject. Consequently, the maximum opening of the sectors is variable depending on the brightness in the entire view range. In order to obtain an adequate amount of strobe light, it is necessary to emit light from the flash unit with the proper stop determined in the aforementioned process. However, there may occur a case where the sectors fail to open up to the required extent. For example, if the stop for an adequate amount of strobe light is F 4 while the maximum opening of the sectors corresponds to F 5.6, that is, if the maximum stop aperture obtainable in EE photography is smaller than the aperture required for the strobe light, then the flash unit is discharged when the sectors are opened to a maximum thereof under the EE photographic condition (termed "summit flash"). To the contrary, if the aperture required for the strobe light is F 8 while the maximum stop aperture obtainable in EE photography is F 5.6, then the flash unit is discharged with such timing that the aperture becomes F 8 (termed "intermediate flash").

The procedure mentioned above is shown in the flowchart, wherein "Tsync←Tsync FM" and "Tsync←Tsync EE" denote that the constant is set for effecting the above-described "intermediate flash" and "summit flash", respectively. In effecting summit flash, a signal for discharging the strobe flash unit may be produced in response to generation of a signal to reverse the stepping motor. In such a case, however, there arises a time delay between the electric reverse signal and the actual reverse rotation of the stepping motor (which drives the sectors). For this reason, the Tsync EE data is determined with the above time delay taken into consideration. Furthermore, since the Tsync EE data is settable at any value desired, an error thereof can be eliminated in design regardless of whether the aperture is small or large.

The operation up to this stage is performed continuously and automatically after turning on the power switch. Although no particular description has been given with regard to various alarms and indications, necessary processes may be executed in accordance with individual requirements.

The following step "SD$_2$ ON" shown in the flowchart is carried out to check if the release switch SD$_2$ is turned on or not. Immediately after turn-on of the release switch S$_2$, the program advances to the next shooting mode. The release switch SD$_2$ is connected to an input circuit having both a chattering preventive function and a latch function, so that shooting is possible with "abrupt depression" or "quick depression" which turns on the power switch S1 and the release switch SD2 merely for a short time (on the order of 10 msec) and turns them off immediately. In case the release switch SD2 is not turned on yet in this check, the power hold action is released so that, if the power switch S1 is turned off in such a state, all of the circuits are switched off to terminate all actions with the exception of photometering. When the release switch SD2 is turned on, a power hold signal is outputted again to perform a series of operations until completion of a predetermined one regardless of the state of the power switch S1.

If a self-timer switch Ss shown in FIG. 3(A) is at its on-position after to application of the power hold signal, the camera is placed in a self-timer mode and therefore the self-timer is activated. In case the switch Ss is at its off-position, the program advances to the next step. In "Self-Timer", a time of 10 seconds or so is measured as in an ordinary self-timer with indication of a self-timer mode. In the next step "Release Mg ON", an electromagnet (release magnet) is energized to release the shooting lens. When the lens has been displaced to a required focal point in a state where the release magnet is energized, a signal is outputted from the automatic focusing circuit to halt the lens. Here, the microprocessor performs merely the task of producing a signal for initiating displacement of the shooting lens. Upon completion of the displacement of the lens, the automatic focusing circuit generates a completion signal, and subsequently the program advances to "Date Lamp" where a lamp for printing a photographing date on the film is turned on for a short or long time in accordance with a high or low film speed to provide a proper amount of exposure.

In the next step "Exposure", the sectors are actuated by the stepping motor to effect exposure, of which detail is shown in the flowchart of FIG. 3(I-3).

First, the clock frequency to be inputted to the counter 129 is selected in "f select". The reference for selection is based on the computed exposure in such a manner that a low clock frequency is selected for a long exposure time and a high clock frequency for a short exposure time. Subsequently the signal $\phi 0$ for the stepping motor is turned to a level H to energize the motor, and such a state is held for a period of 10 msec. The purpose of this action resides in achieving stable rotation of the stepping motor. The rest position of the rotor immediately before energization is determined by the attractive torque exerted between the static rotor magnet and the stator, so that such rest position is prone to be affected by friction and load and is therefore not exactly fixed. And, naturally, a variation in the start position of the stepping motor induces fluctuation in the exposure. Since a great force is applied to the rotor as a result of energization, the halt position of the rotor is rendered fixed, but a certain period of time is required until attaining stabilization of the rotor at its halt position immediately after displacement thereof caused from the rest position to the halt position due to energization. If the next pulse is generated prior to achieving such stabilized state, the exposure comes to be excessive. Although there exists no problem in the case of low Ev, some exposure variation is unavoidable in the case of high Ev where the exposure is small in amount.

Accordingly, in order to ensure a stable exposure, it is necessary to take a sufficient time until attaining stabilization of the rotor. Then a check is made to be ascertain whether the strobe flash unit needs to used or not. And when using the flash unit is necessary, data relative to the time for discharging the flash unit is set in the timer 121, which is subsequently started. In this stage, the timing to start the timer is to be determined. Usually it is started either simultaneously with start of the stepping motor or with a predetermined time delay therefrom. In the latter case, the above data should be altered properly with such time delay taken into consideration.

Since the data set in the timer is accessed by the D-ROM 116 on the basis of the aforementioned result of calculation, the constitution of the D-ROM 116 and the procedure for operating the same will be described below with regard to the above and other data.

FIG. 3(J) shows an exemplary constitution of the D-ROM 116 which is composed of 16 bits×256 words and is divided into four blocks a through d. The block a stores therein exposure data used for control of the stepping motor. This data includes the number of incremental steps Ns of rotation of the stepping motor, and a pulse duration Td of the drive pulse used for directionally reversing the motor rotation. The above data is selectively accessed by the aforementioned sum Ex obtained through the EE calculation and, when the sum Ex has a small value to signify a high Ev, the number of steps Ns becomes small; and when the sum Ex has a large value to signify a low Ev to the contrary, the number of steps Ns becomes large. Normally the exposure range to be controlled extends at most from Ev 19 to Ev 3, so that if 1 Ev is divided into 8 grades, total exposure grades amount to 16×8=128. And a proper exposure, out of such 128 exposure grades, is selectively accessed by the aforesaid sum Ex. Consequently, it follows that the sum Ex ranges from 0 to 127. In the exemplary embodiment of the invention, the data is so formed that the number of steps Ns is represented by 4 bits, and the pulse duration Td by 10 bits, respectively.

The next block b stores therein timing data in the form of time data Tsync (FM) which determines the timing to trigger the strobe flash unit in such a shooting mode that the sectors are once opened to the full aperture thereof and then are closed. The data Tsync (FM) correlates the time delay effected by the timer 121 and represents the timing at which the aperture of the sectors reaches a desired F-stop during the opening course, and therefore this data needs to be so graded as to correspond to a range of F 2.8 to F 22 which are required for flash photography. Supposing now that one F-stop is divided into eight, sub-divisions it follows that the data is divided into 6 (stops)×8+1=49. Such data is selectively accessed according to a value AFMx obtained by adding a fixed value Co to the aforesaid calculated value AFM. The block b further stores therein other data required in backlight photography, and this data is utilized for comparing the maximum aperture, which is obtained in EE photography, with the aperture required for the strobe flash unit. For such comparison of the two apertures, it is naturally necessary to know the maximum aperture in EE photography which, however, is not found from the aforesaid sum Ex obtained through the EE calculation. Therefore, when the aperture required for the flash unit has been obtained from the value AFMx, a value Eo corresponding to the sum Ex in the EE calculation representative of such required aperture needs to be written at the same address. Therefore, under the condition Ex≦Eo where the aperture required for the flash unit is greater than the other, summit flash is executed as described previously. To the contrary, under the condition Ex>Eo, intermediate flash is executed. In the latter case utilizing one stop of the sectors during the opening course thereof, data Tsync (FM) is used to determine the timing for triggering the flash unit. Meanwhile in the former case of summit flash, data Tsync (EE) stored in the block c is used to determine such timing. When effecting summit flash, the data Tsync (EE) required is one stored at an address E1 defined by adding a fixed numerical value Cl to address data Eo. Each of the data Tsync (FM) and Tsync (EE) is composed of 9 bits, and the address data Eo is composed of 7 bits.

In the block d, the sequential code of distance obtained from the automatic focusing circuit is converted to the aforementioned calculation code, and the data stored at an address defined by adding a fixed numerical value C2 to the sequential code DAF is equivalent to the calculation code corresponding to the distance represented by the sequential code DAF. Although depending on the range of distance, it is generally considered that 7 bits are sufficient for the calculation code.

In the D-ROM 116 having a capacity of 16 bits×256 words, the 16 bits of each word are not always used entirely as mentioned previously, so that the number of words may be increased by reducing the number of bits per word. Since some degree of freedom is permitted with regard to the constitution, the most rational means may be selectively adopted. The reason for employing the D-ROM to control the exposure time and the timing to discharge the flash unit resides in the fact that the opening rate of the sectors is not constant with respect to time. If the area of the shutter aperture increases in a fixed relationship with respect to the number of stepping-motor drive pulses, then it becomes possible to determine the timing to close the shutter merely by a combination of a time generating means and exposure information without the necessity of controlling the closing action on the basis of the data from the D-ROM. Actually, however, when the relationship between the stepping motor and the sectors is so established in design as to maintain the shutter aperture in a fixed relationship with respect to time, a transmission mechanism disposed therebetween becomes structurally complicated, and a simple row of wheels is not sufficient to meet the requirements. The same problem exists with regard to the timing to discharge the strobe flash unit since the relationship between the time and the stop is not kept constant, whereby the D-ROM is rendered necessary.

Returning now to "Exposure" in the flowchart, when the counter 119 connected directly to the motor control circuit 120 as mentioned previously functions to control the stepping motor through the motor drive circuit 103, the sectors begin to be actuated in this stage. Describing the operation in conformity with the progress of the flowchart, "Forward Rotation Pulse Output" means that pulses of a fixed duration (e.g. 2 msec) are outputted, and the number thereof is coincident with the number of steps Ns written in the aforementioned D-ROM 116. After generation of such pulses equal in number to the steps Ns, the duration Tv of drive pulses from the D-ROM 116 for a directional change is set in the counter 119, whereby a down-counting action is initiated. And upon termination of such action in the counter 129, a count completion signal is generated to reverse the shift direction of the register 133, thereby shifting its content by 1 bit. The term "Reverse Rotation Pulse Output" means that pulses of a fixed duration are outputted correspondingly to the number of steps Ns as in the preceding "Forward Rotation Pulse Output".

Figure 3K:
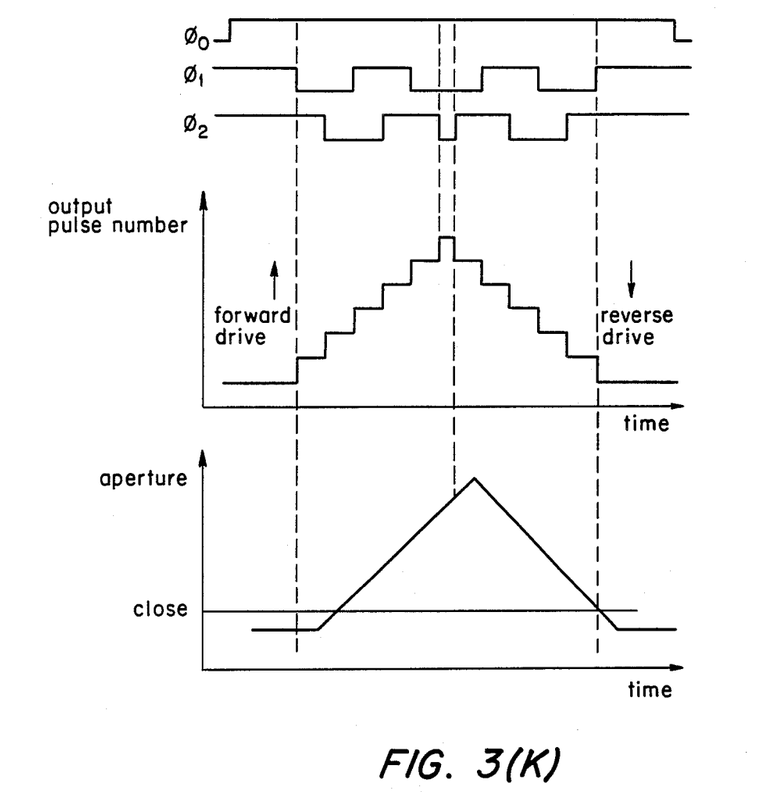
Figure 4:
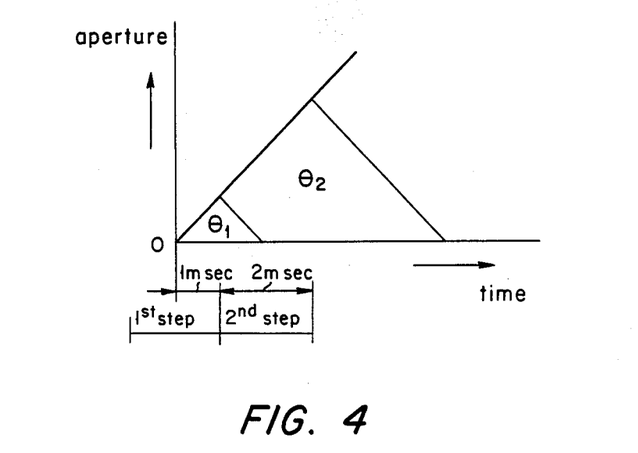
FIG. 4 is a graph showing the relation between aperture and time for different steps of rotation of the stepping motor.

The relationship between the motor drive pulses and the aperture in this step is shown in FIG. 3(K). Since motor drive pulse signals $\phi 1$ and $\phi 2$ are plotted here with the same timing as in FIG. 3(F), the state of energization of the coils L1 and L2 can be known therefrom. The number of output pulses is plotted with directional changes relative to forward and reverse rotations, so that each timing essentially needs to be coincident with that in the graph showing the relationship between the aperture and the time. Actually, however, a lag is produced due to the existence of a response delay in the mechanism. That is, the forward rotation pulse output is a signal to open the shutter, while the reverse rotation pulse output is a signal to close the shutter. After generation of a required number of reverse rotation pulses, such state is kept for a period of 10 msec. If the stepping motor coils are not energized when halting the rotation of the rotor, a large position regulating force is not exerted so that the rotor is brought to a halt while being attenuated with a relatively large amplitude and a relatively long cycle. Therefore, an undesired phenomenon (reexposure) is prone to occur in such a manner that the sectors are also actuated in connection with such movement of the rotor, and the shutter once closed is opened again. However, in case the stepping motor coils are energized when halting the rotor rotation, a large position regulating force is applied thereto to eliminate the above problem.

The routine for exposure is thus finished, and then the program advances to "Continuous-Opening Prevention". This step is executed to prevent continuous opening of the shutter in case the shutter fails to be closed properly due to some fault. The process is carried out in accordance with the state of a home switch SWH which is turned on when the sectors are closed. Another step for prevention of such continuous opening is also existent in the initial stage of the flowchart as described previously, and both are executed for the same purpose.

FIG. 3(I-4) is a flowchart of such a continuous-opening prevention step in which, when the home switch SWH is in its on-state, this routine is skipped over. If the home switch SWH is in its off-state, the stepping motor is reversed merely by 1 step and subsequently a check is made in this routine to ascertain whether reverse rotation pulses have been outputted a prescribed number of times NMAx. And when the result is below the number NMAx, another check is made to discriminate between the on-state and off-state of the home switch SWH, and the operation returns to the main routine in the case of the on-state or repeats generation of reverse rotation pulses in the case of the off-state. The reason for establishing the limit NMAx relative to the number of repetitions resides in preventing occurrence of an undesired state where, when the stepping motor is rendered unrotatable due to some trouble, the home switch SWH cannot be turned on even by repeated generation of pulses and eventually the program fails to advance any further. Since such state signifies a fault, the program jumps to the step [1].

After passage through the routine for continuous-opening prevention, the signal $\phi 0$ for energizing the stepping motor is altered to a level L, and subsequently the output at the power hold terminal PH is also altered to a level L, so that the transistor Tr2 is turned off to immediately switch off all of the circuits if the power switch S1 is in its off-state, thereby terminating all of the actions. In case the power switch S1 is in its on-state, it is turned off by returning the release so that all the circuits are switched off.

Briefly describing here the test mode which has been omitted in the foregoing explanation, the purpose of such test resides in inspecting the performance and so forth of the shutter. The circuit is equipped with some particular functions for measurement and adjustment to realize, depending on the condition of the test terminal, a specific exposure (e.g. Ev 16) or generation of a strobe signal with a specific stop in the FM mode.

As described hereinabove, according to the present invention wherein a coded value of information including a distance to a subject and so forth required for flash photography is calculated and the timing to discharge a strobe flash unit is selected in conformity with the result of such calculation, the process is not based on the conventional analog computation, and the control circuit is free from any harmful effect relative to the temperature characteristic, voltage characteristic and the like, so that no compensating circuit is required and a satisfactory calculation accuracy is ensured to achieve high reliability. Furthermore, the flash timing is settable as desired by using the data stored in the ROM, hence eliminating the necessity of matching between the shutter mechanism and the electronic circuit to consequently enable unrestricted design with remarkably great advantages.

What is claimed is:

1. A strobe control circuit for use with shutter having a triggerable strobe flash unit, distance input means for inputting distance information relating to the distance to a subject, a plurality of movable sectors for forming a lens aperture and being movable in an opening direction from a closed position to gradually increase the size of the lens aperture to a desired aperture and then movable in a closing direction to gradually decrease the size of the lens aperture as the sectors return to the closed position, and a stepping motor rotatable in forward and reverse directions to effect the opening and closing of said sectors, said strobe control circuit comprising: a reference oscillator; a timer circuit operating synchronously with said oscillator to perform a timer action and generating an output signal to trigger said strobe flash unit upon completion of the timer action; means for generating a coded value corresponding to the distance information inputted by said distance input means; a circuit for computing said coded value and another coded value corresponding to the guide number of said strobe flash unit; and data memory means in which the data to be present in said timer circuit is stored at an address corresponding to the output of said computing circuit, wherein the data in said memory means is accessed, when using said strobe flash unit, in accordance with the computed value and then is preset in said timer circuit, whose action is subsequently started synchronously with said stepping motor which drives said sectors.

2. The strobe control circuit as defined in claim 1, further comprising film speed input means for inputting a coded value of a film speed so that said coded value and another coded value representing said distance are computed and used as an address value to access the data in said memory means.

3. The strobe control circuit as defined in claim 2, further comprising an object lens having a focal length that is changeable to either of first and second values and, at a changeover time thereof, its full aperture is varied from a first F-number to a second F-number; means for detecting such changeover of the focal length; and means for converting said first or second value of the focal length to a coded value so that an address value obtained through calculation of said coded value and said computed value is used to access the data in said memory means.

4. The strobe control circuit as defined in claim 1, further comprising an object lens having a focal length that is changeable to either of first and second values and, at a changeover time thereof, its full aperture is varied from a first F-number to a second F-number; means for detecting such changeover of the focal length; and means for converting said first or second value of the focal length to a coded value so that an address value obtained through calculation of said coded value and said computed value is used to access the data in said memory means.

5. In a photographic camera shutter having a plurality of shutter sectors for forming a lens aperture and for defining an exposure interval and being displaceable in an opening direction from a closed position to progressively increase the size of the lens aperture to a desired aperture size and then displaceable in a closing direction to progressively decrease the size of the lens aperture as the sectors return to the closed position thereby defining the exposure interval, driving means including a bidirectional stepping motor rotatable in forward and reverse directions for effecting displacement of the sectors in the opening and closing directions, distance input means for inputting distance information corresponding to the distance to an object to be photographed, and a strobe flash unit operative when triggered by a trigger signal to emit a strobe flash during flash photography: control circuitry for determining the aperture size during flash photography and controlling the triggering of the strobe flash unit in accordance with the aperture size, the control circuitry comprising computing means for computing a coded value representative of the distance information inputted by the distance input means; data memory means for storing at different address locations therein flash timing data corresponding to different correlated time delays and aperture sizes according to different coded values; timing circuit means responsive to flash timing data applied thereto for producing a trigger signal after a time delay corresponding to the flash timing data applied thereto and for applying the trigger signal to the strobe flash unit; means for accessing the data memory means with the computed code value and retrieving therefrom the flash timing data corresponding to the computed coded value and applying the retrieved flash timing data to the timing circuit means; and means for synchronizing the start of the forward rotation of the stepping motor with the start of the timer action of the timing circuit means.

6. A photographic camera shutter according to claim 5; including guide number input means for inputting guide number information corresponding to the guide number of the strobe flash unit; and the computing means includes means for computing a coded value based on both the distance information and the guide number information.

7. A photographic camera shutter according to claim 5; includng film speed input means for inputting film speed information; and the computing means includes means for computing a coded value based on both the distance information and the film speed information.

8. A photographic camera chutter according to claim 5; wherein the data memory means comprises a read only memory.

* * * * *